(12) United States Patent
Song et al.

(10) Patent No.: US 10,223,414 B2
(45) Date of Patent: Mar. 5, 2019

(54) DEVICE FOR DETERMINING SAMENESS BETWEEN DIFFERENT LANGUAGES AND METHOD THEREOF

(71) Applicant: Samsung Electronics Co., Ltd., Suwon-si, Gyeonggi-do (KR)

(72) Inventors: Gene Wook Song, Suwon-si (KR); Byung Joon Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 15/044,549

(22) Filed: Feb. 16, 2016

(65) Prior Publication Data

US 2016/0239539 A1 Aug. 18, 2016

(30) Foreign Application Priority Data

Feb. 17, 2015 (KR) .................. 10-2015-0024526

(51) Int. Cl.
*G06F 17/30* (2006.01)
*G06F 17/22* (2006.01)
*G06F 17/28* (2006.01)
*G06Q 10/10* (2012.01)

(52) U.S. Cl.
CPC .... *G06F 17/30439* (2013.01); *G06F 17/2223* (2013.01); *G06F 17/2863* (2013.01); *G06F 17/3043* (2013.01); *G06Q 10/10* (2013.01)

(58) Field of Classification Search
CPC ....................................................... G06F 17/30
USPC ................................................ 707/706, 756
See application file for complete search history.

(56) References Cited

U.S. PATENT DOCUMENTS

| | | | |
|---|---|---|---|
| 7,231,558 B2* | 6/2007 | Gentieu | H04L 1/243 714/704 |
| 7,543,189 B2* | 6/2009 | Fichter | G06F 11/3688 704/8 |
| 7,711,550 B1* | 5/2010 | Feinberg | G06F 17/278 704/1 |
| 8,010,338 B2 | 8/2011 | Thorn | |
| 8,706,747 B2 | 4/2014 | Mittal et al. | |
| 9,092,400 B1* | 7/2015 | Lin | G06F 17/218 |
| 2003/0058280 A1* | 3/2003 | Molinari | G01R 13/345 715/771 |
| 2003/0074185 A1 | 4/2003 | Kang | |
| 2003/0135359 A1 | 7/2003 | Wah Low et al. | |

(Continued)

FOREIGN PATENT DOCUMENTS

| CN | 101542419 A | 9/2009 |
|---|---|---|
| CN | 103136658 A | 6/2013 |

(Continued)

*Primary Examiner* — Kim T Nguyen
(74) *Attorney, Agent, or Firm* — Jefferson IP Law, LLP

(57) ABSTRACT

An electronic device is provided. The electronic device includes a memory in which contact information is stored, a communication circuit configured to receive at least one piece of contact information from the outside, and a processor configured to unify language scripts between a name of the stored contact information and a name of the received contact information and determine whether to integrate the stored contact information and the received contact information by comparing the name of the stored contact information with the name of the received contact information in a unified language script.

20 Claims, 5 Drawing Sheets

(56) References Cited

U.S. PATENT DOCUMENTS

| | | | |
|---|---|---|---|
| 2003/0191626 A1 | 10/2003 | Al-Onaizan et al. | |
| 2004/0261021 A1 | 12/2004 | Mittal et al. | |
| 2007/0055655 A1 | 3/2007 | Bernstein et al. | |
| 2007/0219933 A1* | 9/2007 | Datig | G06F 17/279 706/4 |
| 2008/0114583 A1 | 5/2008 | Al-Onaizan et al. | |
| 2008/0126077 A1 | 5/2008 | Thorn | |
| 2010/0125595 A1* | 5/2010 | Iizuka | G06F 9/445 707/758 |
| 2012/0054595 A1* | 3/2012 | Mylroie | G06F 21/10 715/234 |
| 2012/0203821 A1 | 8/2012 | Czajka | |
| 2013/0097124 A1 | 4/2013 | De Souza et al. | |
| 2014/0019531 A1 | 1/2014 | Czajka et al. | |
| 2014/0188454 A1 | 7/2014 | Mittal et al. | |
| 2015/0101060 A1* | 4/2015 | Schmitz | H04L 51/043 726/26 |
| 2015/0242490 A1 | 8/2015 | Czajka et al. | |

FOREIGN PATENT DOCUMENTS

| | | |
|---|---|---|
| JP | 5413194 B2 | 2/2014 |
| KR | 10-2001-0016679 A | 3/2001 |
| WO | 03/079225 A1 | 9/2003 |

* cited by examiner

DEVICE FOR DETERMINING SAMENESS BETWEEN DIFFERENT LANGUAGES AND METHOD THEREOF

CROSS-REFERENCE TO RELATED APPLICATION(S)

This application claims the benefit under 35 U.S.C. § 119(a) of a Korean patent application filed on Feb. 17, 2015 in the Korean Intellectual Property Office and assigned Serial number 10-2015-0024526, the entire disclosure of which is hereby incorporated by reference.

TECHNICAL FIELD

The present disclosure relates to an electronic device for determining homogeneity between heterogeneous languages and a method to be performed in the electronic device. More particularly, the present disclosure relates to an electronic device and a method of determining homogeneity between heterogeneous languages by comparing contact information stored in a memory with contact information received from the outside.

BACKGROUND

With the development of information and communication technology, network devices, such as base stations, have been installed all over the country so that electronic devices may exchange data with other electronic devices through a network, thereby enabling users to access the network anywhere in the country.

With the trend of digital convergence, various types of electronic devices provide various functions. For example, a smartphone supports an Internet access function using the network, or supports a function of playing music or videos or a function of capturing images or videos using an image sensor, in addition to a call function.

Furthermore, such an electronic device may receive and use data which is not stored in the electronic device but is stored in an external server using a synchronization method, and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for determining homogeneity between heterogeneous languages.

In accordance with an aspect of the present disclosure, an electronic device is provided. The electronic device includes a memory in which contact information is stored, a communication circuit configured to receive at least one piece of contact information from the outside, and a processor configured to unify language scripts between a name of the stored contact information and a name of the received contact information and determine whether to integrate the stored contact information and the received contact information by comparing the name of the stored contact information with the name of the received contact information in a unified language script.

In accordance with another aspect of the present disclosure, a method to be performed in an electronic device is provided. The method includes receiving at least one piece of contact information from the outside, unifying language scripts between a name of contact information stored in a memory and a name of the received contact information, comparing the name of the stored contact information with the name of the received contact information in a unified language script, and determining whether to integrate the stored contact information and the received contact information based on a result of the comparing.

In accordance with another aspect of the present disclosure, at least one non-transitory computer-readable recording medium for storing a computer program configured to be readable by at least one processor is provided. The at least one non-transitory computer-readable recording medium may be configured to perform receiving at least one piece of contact information from the outside, unifying language scripts between a name of contact information stored in a memory and a name of the received contact information, comparing the name of the stored contact information with the name of the received contact information in a unified language script, and determining whether to integrate the stored contact information and the received contact information based on a result of the comparing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
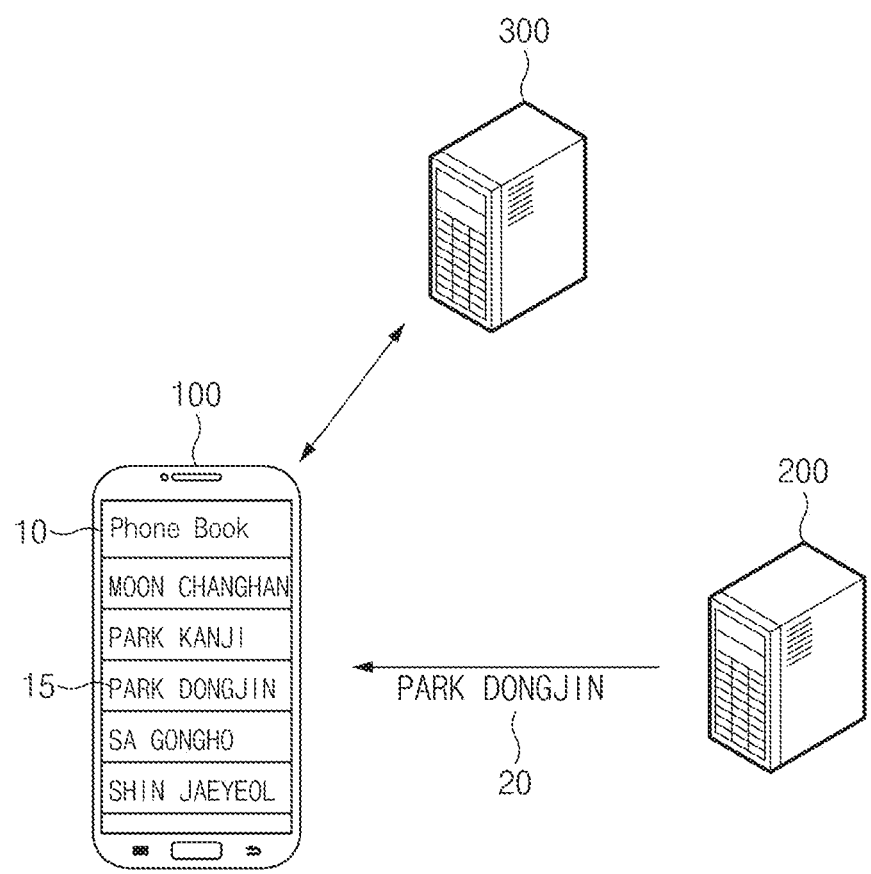
FIG. 1 illustrates a system for determining homogeneity of heterogeneous languages according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "have", "may have", "include", "may include", "comprise", and the like, used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second", and the like, used herein may modify various elements regardless of the order and/or priority thereof, but does not limit the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device (e.g., smartglasses, a head-mounted device (HMD), an electronic apparel, an electronic bracelet, an electronic necklace, an electronic appcessory, an electronic tattoo, a smartmirror, a smartwatch, and the like).

In various embodiments of the present disclosure, an electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, and the like), a magnetic resonance angiography (MRA), a magnetic resonance imaging (MRI), a computed tomography (CT), a scanner, an ultrasonic device, and the like), a navigation device, a global positioning system (GPS) receiver, an event data recorder (EDR), a flight data recorder (FDR), a vehicle infotainment device, electronic equipment for vessels (e.g., a navigation system, a gyrocompass, and the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, and the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, and the like). In various embodiments of the present disclosure, an electronic device may be one or more combinations of the above-mentioned devices.

An electronic device according to various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates a system for determining homogeneity of heterogeneous languages according to various embodiments of the present disclosure.

Referring to FIG. 1, the environment in which homogeneity of heterogeneous languages is determined may include an electronic device 100, a synchronization server 200, and a language server 300.

The electronic device 100 may be any one of the above-mentioned various electronic devices. However, the electronic device 100 according to various embodiments of the present disclosure is assumed as a smartphone below. The synchronization server 200, which is capable of performing contact information synchronization, may represent a server operated by a provider of a social network service (SNS), such as Facebook, Twitter, LinkedIn, ChatOn, and the like, an electronic device manufacturer, a telecommunications company, and the like.

The electronic device 100 may store a plurality of pieces of contact information in a memory of the electronic device 100. Each piece of the contact information may include a name and a phone number, and may further include various information, such as a mail address, a birthday, an anniversary date, and the like.

The electronic device 100 may perform synchronization of the contact information with the synchronization server 200 at a preset time or in response to a user input received from a user. According to various embodiments of the present disclosure, the synchronization may be performed in response to a request sent from the electronic device 100 to the synchronization server 200 or a request sent from the synchronization server 200 to the electronic device 100.

The electronic device 100 may display, through a phone book application 10, the contact information stored in the memory. As an example of the contact information stored in the memory, the electronic device 100 may display contact information 15 stored as "박농진". As performance of the synchronization, the synchronization server 200 may transmit at least one piece of contact information to the electronic device 100. For example, the synchronization server 200 may transmit contact information 20 registered as "PARK DONGJIN" to the electronic device 100.

The electronic device 100 may compare the contact information 20 received from the synchronization server 200 with the plurality of pieces of the contact information stored in the memory of the electronic device 100 to determine which one the plurality of pieces of the contact information matches the received contact information 20. For example, in the case where 100 pieces of contact information are stored in the memory of the electronic device 100, the electronic device 100 may compare the received contact information 20 with each piece of the contact information stored in the memory to determine whether contact information corresponding to the received contact information 20 exists. The following description is provided with respect to a sequence of comparing, by the electronic device 100, the received contact information 20 with the contact information 15 stores in the memory.

It may be understood that the contact information 15 includes a contact name written in Korean script and the contact information 20 includes a contact name written in Roman script. Before comparing the contact information 15 with the contact information 20, the electronic device 100 may unify the two pieces of contact information in the same language script. According to various embodiments of the present disclosure, the electronic device 100 may change the contact information 15 into English, or may change the contact information 20 into Korean. Alternatively, the electronic device 100 may change the contact information 15 and the contact information 20 into characters of a third language script other than the Korean or Roman script.

In various embodiments of the present disclosure, the electronic device 100 may change a contact name written in the Korean script into a contact name written in the Roman script by default. The electronic device 100 may divide " 박농진 " of the contact information 15 into syllables, and then may generate a plurality of Roman characters from each syllable. For example, the electronic device 100 may change "ㅂ" into "b" or "p", may change "ㅏ" into "a", and may change "ㄱ" into "k", "g", or "rk". In this case, six Roman character sets "bak", "bag", "bark", "pak", "pag", and "park" corresponding to " 박 " may be generated. The electronic device 100 may similarly generate Roman character sets with respect to " 농 " and " 진 ".

The above-mentioned operation of generating a plurality of Roman character sets from each syllable may be performed based on a phoneme-based Romanization system. The phoneme-based Romanization system may be data received from the language server 300. Alternatively, the operation of generating a plurality of Roman character sets from each syllable may be performed in the language server 300, and, in this case, the electronic device 100 may receive a plurality of generated Roman character sets from the language server 300.

According to various embodiments of the present disclosure, the language server 300 may be, for example, a server of a language-related institution (e.g., National Institute of Korean Language) of each country, and may store the data of the phoneme-based Romanization system. The language server 300 may store data for the case where the Roman script is converted into the Korean script in addition to the data for converting the Korean script into the Roman script. Furthermore, the language server 300 may store various data for converting not only the Korean or Roman script but also Chinese script, Japanese script, Greek script, Arabic script, Cyrillic script, and the like, into each other.

The electronic device 100 may determine whether the contact information 15 corresponds to the contact information 20 by comparing the plurality of generated Roman character sets with the contact information 20 received from the synchronization server 200. In the case where the contact information 15 corresponds to the contact information 20 as a result of the determination, the electronic device 100 may integrate the contact information 15 and the contact information 20. According to various embodiments of the present disclosure, in the case where the contact information 15 corresponds to the contact information 20, the electronic device 100 may ignore the contact information 20 or may update the contact information 15 with the contact information 20, and may provide, to the user, a user interface (UI) for querying an intention of the user.

According to various embodiments of the present disclosure, the electronic device 100, the synchronization server 200, and the language server 300 may be connected to each other via a network. Here, the network, which represents a connection structure for enabling information exchange between nodes, such as terminals and servers, may include wireless communications and wired communications. For example, at least one of cellular communication protocols, such as long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like, may be used for the wireless communications. The wireless communications may include, for example, a short-range communications. The short-range communications may include at least one of Wi-Fi, Bluetooth, near field communication (NFC), GPS, and the like. The wired communications may include at least one of universal serial bus (USB), high definition multimedia interface (HDMI), recommended standard 232 (RS-232), plain old telephone service (POTS), and the like. The network may include at least one of telecommunications networks, for example, a computer network (e.g., a local area network (LAN) or wide area network (WAN)), the Internet, or a telephone network.

Figure 2:
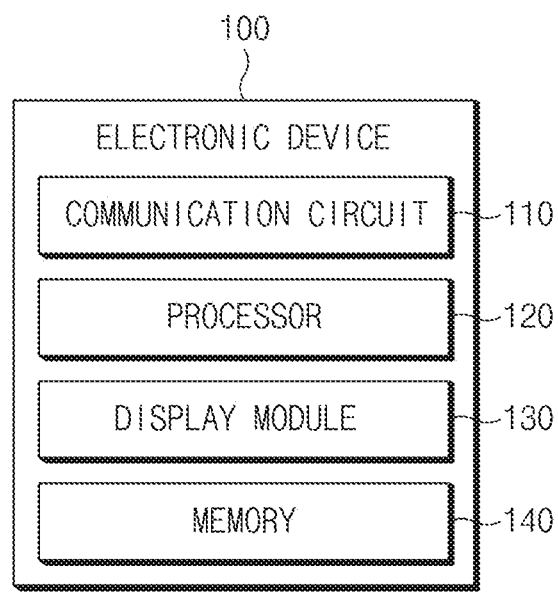
FIG. 2 is a block diagram illustrating a configuration of an electronic device according to various embodiments of the present disclosure.

FIG. 2 is a block diagram illustrating an electronic device according to various embodiments of the present disclosure.

Referring to FIG. 2, an electronic device 100 may include a communication circuit 110, a processor 120, a display module 130, and a memory 140. However, the electronic device 100 illustrated in FIG. 2 is merely an implementation example of the present disclosure, and various modifications thereto may be made. For example, the electronic device 100 may further include a user interface for receiving a certain command or information from the user. In this case, the user interface may be a typical input device, such as a keyboard or a mouse, or may be a graphical UI (GUI) displayed on a screen of the electronic device 100.

The communication circuit 110 may perform communication using at least one of the networks mentioned above with reference to FIG. 1. The communication circuit 110 may receive, from the synchronization server 200, a plurality of pieces of contact information to be synchronized.

The processor 120 may be implemented with, for example, a system on chip (SoC) and may include at least one of a CPU, a graphics processing unit (GPU), an image signal processor, an AP, or a communication processor (CP). The processor 120 may load, from the memory 140, an instruction or data received from at least one of other elements (e.g., the communication circuit 110 and the display module 130) to process the instruction or data, and may store various data in the memory 140.

The processor 120 may compare a plurality of pieces of contact information stored in the memory 140 with a plurality of pieces of contact information received from the synchronization server 200. The comparison between the pluralities of pieces of contact information may be performed through one-to-one comparison. For example, in the case where the number of the pieces of contact information stored in the memory 140 is 10 and the number of the pieces of contact information received from the synchronization server 200 is 10, the processor 120 may perform a one-to-one comparison process 100 times.

The following description is provided with respect to an example in which the processor 120 compares one piece of contact information stored in the memory 140 (hereinafter referred to as first contact information) with one piece of contact information received from the synchronization server 200 (hereinafter referred to as second contact information).

The processor 120 may determine whether a name of the first contact information and a name of the second contact information are written in the same language script. If the name of the first contact information and the name of the second contact information are not written in the same language script, the processor 120 may unify the name of the first contact information and the name of the second contact information in the same language script. Respective language scripts of the name of the first contact information and the name of the second contact information may be determined based on Unicode.

According to various embodiments of the present disclosure, the processor 120 may determine which one of the language script of the name of the first contact information and the language script of the name of the second contact information should be selected as a unification language script. Alternatively, the processor 120 may select, as a unification language script, a third language script other than the language script of the name of the first contact information and the language script of the name of the second contact information. In various embodiments of the present disclosure, the unification language script may be set as Roman script, particularly, English-American Roman script by default.

Hereinafter it is assumed that the name of the first contact information is written in the Korean script and the name of the second contact information is written in the English-American Roman script to describe various embodiments of the present disclosure.

The name of the first contact information may be " 친병준 ", and the name of the second contact information may be "BYUNGJUN CHUN". The processor 120 may divide the name of the first contact information into syllables, and may apply a Romanization system to each phoneme of each syllable. A method of applying the Romanization system will be described with reference to FIG. 3.

Figure 3:
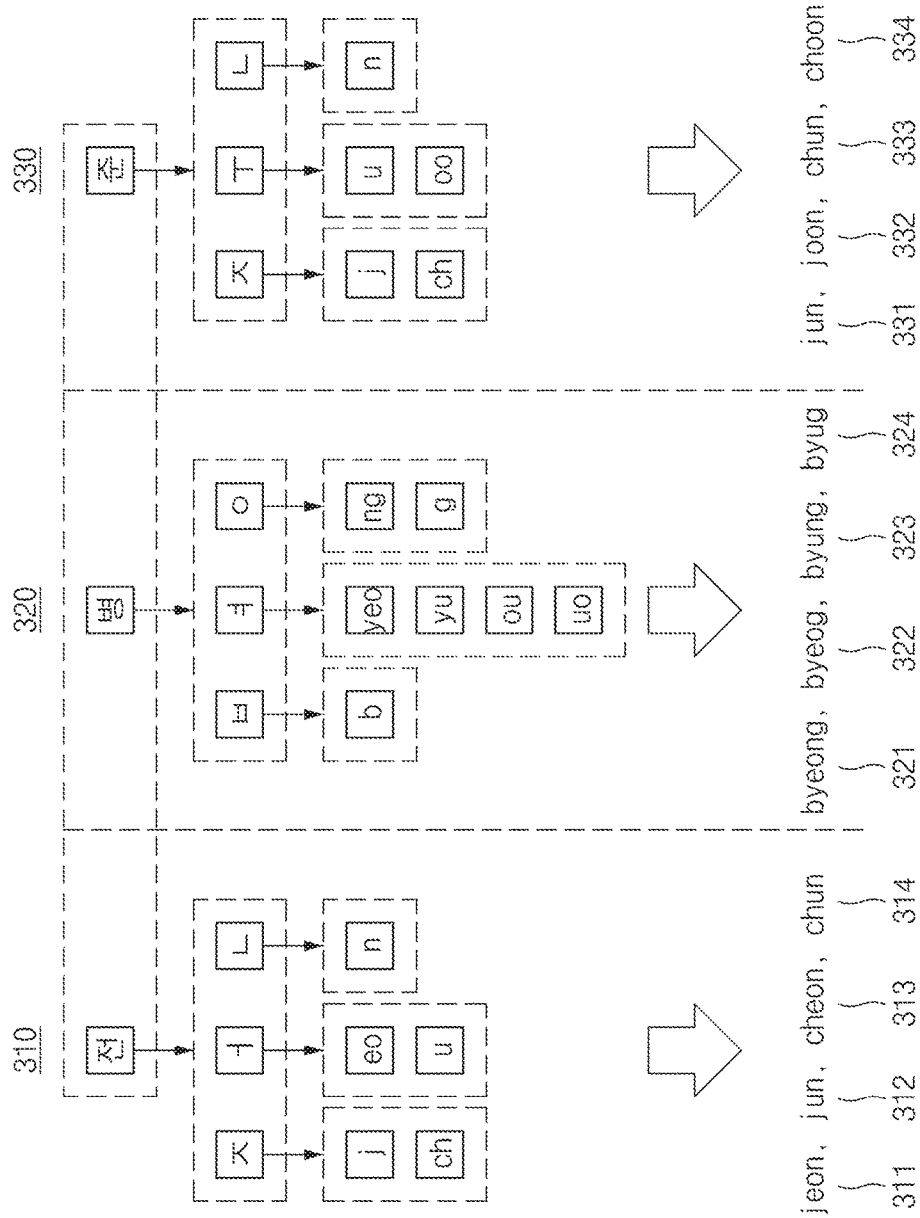
FIG. 3 is a diagram illustrating a method of converting a name written in Korean script into a name written in Roman script according to various embodiments of the present disclosure.

FIG. 3 is a diagram illustrating a method of converting a name written in the Korean script into a name written in the Roman script according to various embodiments of the present disclosure.

Referring to FIG. 3, the processor 120 may divide the first contact information into a syllable " 전 " 310, a syllable " 병 " 320, and a syllable " 준 " 330 based on syllables.

The syllable " 전 " 310 may include three phonemes " ㅈ ", " ㅓ ", and " ㄴ ". If the Romanization system is applied to the phoneme " ㅈ ", it may be converted into "j" or "ch". If the Romanization system is applied to the phoneme " ㅓ ", it may be converted into "eo" or "u", and, if the Romanization system is applied to the phoneme " ㄴ ", it may be converted into "n". Therefore, the processor 120 may generate "jeon" 311, "jun" 312, "cheon" 313, and "chun" 314 as Roman character sets corresponding to the syllable " 전 " 310.

The syllable " 병 " 320 may include three phonemes " ㅂ ", " ㅕ ", and " ㅇ ". If the Romanization system is applied to the phoneme " ㅂ ", it may be converted into "b". If the Romanization system is applied to the phoneme " ㅕ ", it may be converted into "yeo", "yu", "ou" or "uo", and, if the Romanization system is applied to the phoneme " ㅇ ", it may be converted into "ng" or "g". Therefore, the processor 120 may generate "byeong" 321, "byeog" 322, "byung" 323, "byug" 324, "boung" (not shown), "boug" (not shown), "buong" (not shown), and "buog" (not shown) as Roman character sets corresponding to the syllable " 병 " 320.

The syllable "준" 330 may include three phonemes "ㅈ", "ㅜ", and "ㄴ". If the Romanization system is applied to the phoneme "ㅈ", it may be converted into "j" or "ch". If the Romanization system is applied to the phoneme "ㅜ", it may be converted into "u" or "oo", and, if the Romanization system is applied to the phoneme "ㄴ", it may be converted into "n". Therefore, the processor 120 may generate "jun" 331, "joon" 332, "chun" 333, and "choon" 334 as Roman character sets corresponding to the syllable "준" 330.

According to various embodiments of the present disclosure, the phoneme "ㅈ" may be converted into different Roman characters with respect to a case where the phoneme "ㅈ" is placed as an initial consonant and a case where the phoneme "ㅈ" is placed as a final consonant. For example, in the case where the phoneme "ㅈ" is placed as an initial consonant, the phoneme "ㅈ" may be converted into "j" or "ch", or, in the case where the phoneme "ㅈ" is placed as a final consonant, the phoneme "ㅈ" may be converted into "j" or "t".

The processor 120 may compare each Roman character set of FIG. 3 with the name of the second contact information. This operation is described below with reference to FIG. 4.

Figure 4:
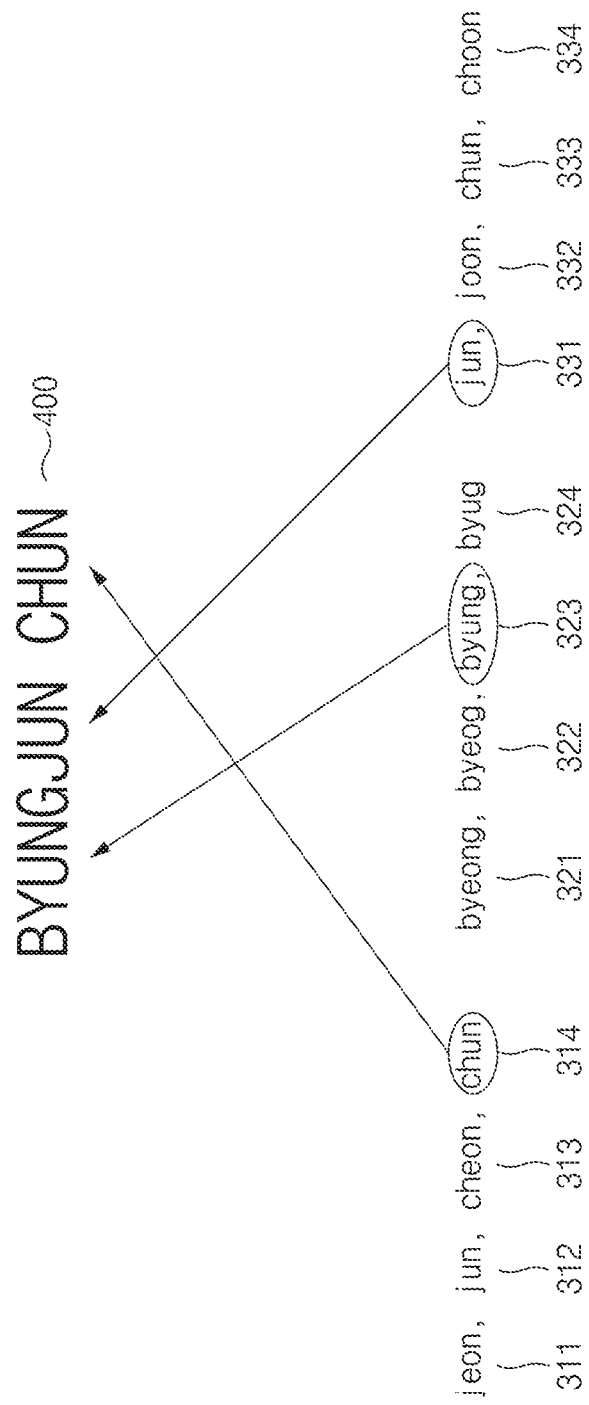
FIG. 4 is a diagram illustrating a method of determining homogeneity of heterogeneous languages according to various embodiments of the present disclosure.

FIG. 4 is a diagram illustrating a method of determining homogeneity of heterogeneous languages according to various embodiments of the present disclosure.

Referring to FIG. 4, the processor 120 may determine whether one of the Roman character sets obtained by converting each syllable of the name of the first contact information is included in the name of the second contact information.

The processor 120 may compare the Roman character sets 311 to 314 corresponding to the syllable "준" 310 with a name "BYUNGJUN CHUN" 400 of the second contact information. Similarly, the processor 120 may compare the Roman character sets 321 to 324 corresponding to the syllable "병" 320 with the name "BYUNGJUN CHUN" 400, and may compare the Roman character sets 331 to 334 corresponding to the syllable "준" 330 with the name "BYUNGJUN CHUN" 400.

Referring to FIG. 4, it may be understood that the Roman character sets "chun" 314, "byung" 323, and "jun" 331 are included in the name "BYUNGJUN CHUN" 400. Therefore, the processor 120 may determine that the first contact information and the second contact information correspond to each other. According to various embodiments of the present disclosure, the processor 120 may determine whether one of the Roman character sets obtained by converting each syllable of the name of the first contact information is included in the name of the second contact information, without differentiating lowercase and uppercase letters.

However, referring to FIG. 4, it may be understood that the Roman character sets "jun" 312, "byung" 323, and "chun" 333 are also included in the name "BYUNGJUN CHUN" 400. If it is determined that the first contact information corresponds to the second contact information even in this case, an error may occur. This is because it may be mistakenly determined that contact information having a name of "진병진" or "천병준" corresponds to the second contact information.

Therefore, the processor 120 may further compare a phone number or a mail address of the first contact information with a phone number or a mail address of the second contact information. Furthermore, when determining whether one of the Roman character sets obtained by converting each syllable of the name of the first contact information is included in the name of the second contact information, the processor 120 may consider an order of the syllables included in the name of the first contact information. For example, an order of a family name and a given name may be reversed between a name of contact information written in the Korean script and a name of contact information written in the Roman script, but an order of two or more syllables of the given name is not changed.

When comparing the name of the first contact information and the name of the second contact information, the processor 120 may exclude unimportant parts of the names. The unimportant part may include, for example, a title, an address term (e.g., brother, sister, Mr., and the like), a number, a special character, and the like.

Furthermore, when comparing the name of the first contact information and the name of the second contact information, the processor 120 may consider a name suffix or an abbreviation. This is because, for example, the term "주니어" written in the Korean script may be written as "junior" in the Roman script but may also be written as "jr.". Furthermore, this is because middle names of English names are frequently abbreviated.

The display module 130 may display various content (e.g., an application execution screen, a text, an image, a video, an icon, a symbol, and the like) on a screen (not shown) of the electronic device 100. The screen may include, for example, a liquid crystal display (LCD), a light-emitting diode (LED) display, an organic LED (OLED) display, a microelectromechanical systems (MEMS) display, or an electronic paper display.

As described above, the display module 130 may display the phone book application 10 on the screen. Furthermore, in the case where the first contact information corresponds to the second contact information, the display module 130 may display, on the screen, a GUI for allowing the user to determine whether to integrate the first contact information and the second contact information or adopt only one of the first contact information and the second contact information.

According to various embodiments of the present disclosure, when a telephone number is registered in the phone book application 10, the phone book application 10 may provide respective fields for receiving a family name and a given name. In this case, a name of contact information which is a criterion of comparison may represent a name in which both the family name and the given name are displayed in combination.

The memory 140 may store data, for example, instructions for operations performed by the processor 120. In this case, the data stored in the memory 140 may include data input/output between elements of the electronic device 100 and data input/output between the electronic device 100 and elements outside the electronic device 100. For example, the memory 140 may store a plurality of pieces of contact information as described above.

The memory 140 may include an internal memory or an external memory. The internal memory may include, for example, at least one of a volatile memory (e.g., a dynamic random access memory (DRAM), a static RAM (SRAM), a synchronous DRAM (SDRAM), and the like), a nonvolatile memory (e.g., a one-time programmable read-only memory (OTPROM), a PROM, an erasable and programmable ROM (EPROM), an electrically erasable and programmable ROM (EEPROM), a mask ROM, a flash ROM, a flash memory (e.g., a NAND flash memory, a NOR flash memory, and the like)), a hard disk drive (HDD), or a solid state drive (SSD).

The external memory may include, for example, a flash drive, such as a compact flash (CF), a secure digital (SD), a micro-SD, a mini-SD, an extreme digital (xD), a multimedia card (MMC), a memory stick, and the like. The external memory may be operatively and/or physically connected to the electronic device 100 through various interfaces.

It would be obvious to those skilled in the art that the communication circuit 110, the processor 120, the display module 130, and the memory 140 may be separately implemented in the electronic device 100 or two or more of the foregoing elements may be integrated with each other.

Figure 5:
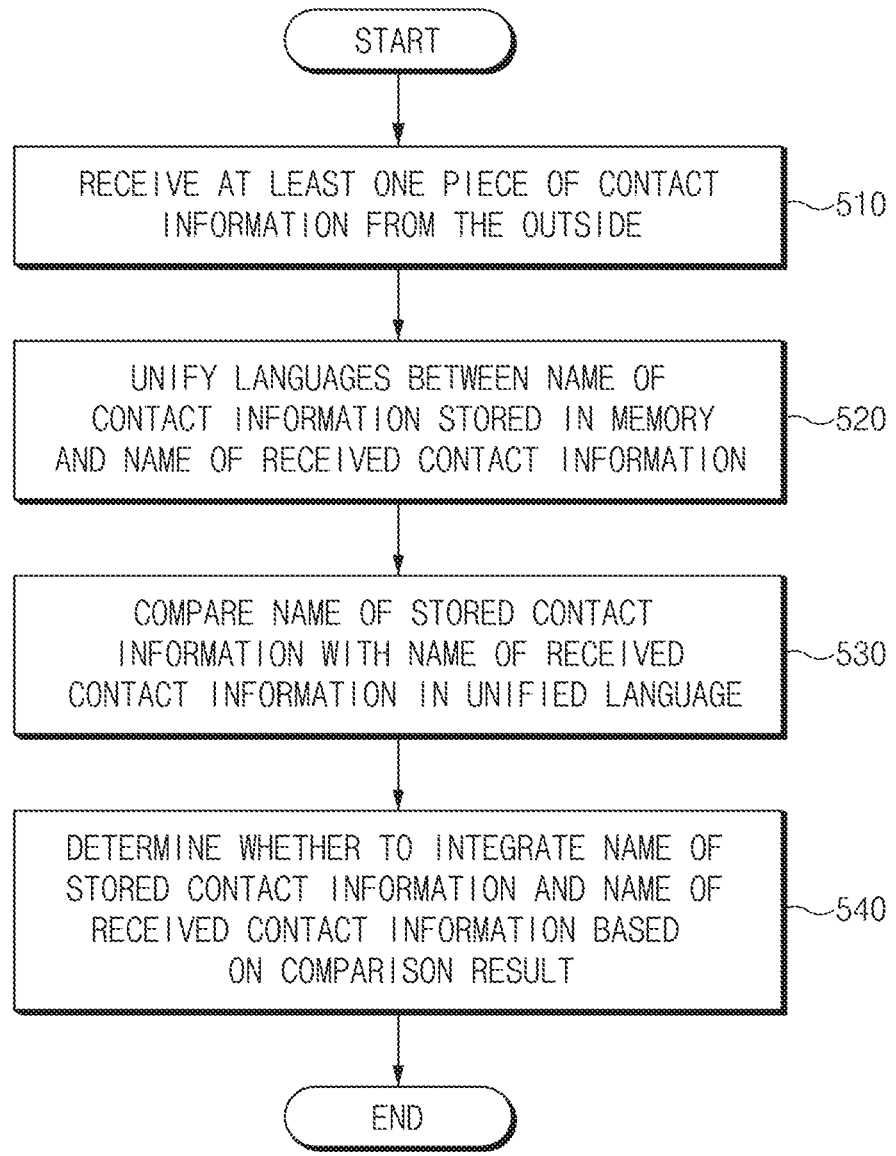
FIG. 5 is a flowchart illustrating a method of determining homogeneity of heterogeneous languages in an electronic device according to various embodiments of the present disclosure.

FIG. 5 is a flowchart illustrating a method of determining homogeneity of heterogeneous languages in an electronic device according to various embodiments of the present disclosure.

Referring to FIG. 5, in operation 510, the electronic device 100 may receive at least one piece of contact information from the outside.

In operation 520, the electronic device 100 may unify languages between a name of contact information stored in the memory and a name of the contact information received in operation 510. For example, after contact information to be compared is determined, the electronic device 100 may change a language script of at least one of the name of the contact information stored in the memory or the name of the contact information received in operation 510 so that the language scripts are equalized, if the name of the contact information stored in the memory differs from the name of the contact information with respect to language script.

In operation 530, the electronic device 100 may compare, in the language unified in operation 520, the name of the contact information stored in the memory and the name of the contact information received in operation 510.

In operation 540, based on a result of the comparison of operation 530, the electronic device 100 may determine whether to integrate the contact information stored in the memory and the contact information received in operation 510.

An electronic device according to various embodiments of the present disclosure may include: a memory in which contact information is stored; a communication circuit configured to receive at least one piece of contact information from the outside; and a processor configured to unify language scripts between a name of the stored contact information and a name of the received contact information and determine whether to integrate the stored contact information and the received contact information by comparing the name of the stored contact information with the name of the received contact information in a unified language script.

According to various embodiments of the present disclosure, the language scripts of the name of the stored contact information and the name of the received contact information may be determined based on Unicode.

According to various embodiments of the present disclosure, an operation of unifying the language scripts between the name of the stored contact information and the name of the received contact information may be performed based on a default script. In this case, the default script may include the language script of the name of the stored contact information, the language script of the name of the received contact information, or another language descript other than the language script of the name of the stored contact information and the language script of the name of the received contact information.

According to various embodiments of the present disclosure, in the case where one of the name of the stored contact information and the name of the received contact information is written in a Korean script and the other is written in a Roman script, the operation of unifying the language scripts may include converting a Korean-script name into a Roman-script name.

According to various embodiments of the present disclosure, the converting the Korean-script name into the Roman-script name may include generating a plurality of Roman character sets by applying a phoneme-based Romanization system to each of a plurality of phonemes included in the Korean-script name.

According to various embodiments of the present disclosure, the phoneme-based Romanization system may differently Romanize a certain phoneme according to whether the certain phoneme is placed as an initial consonant or is placed as a final consonant.

According to various embodiments of the present disclosure, the comparing the name of the stored contact information with the name of the received contact information may include comparing each of the plurality of Roman character sets corresponding to the Korean-script name with the Roman-script name.

According to various embodiments of the present disclosure, the comparing each of the plurality of Roman character sets corresponding to the Korean-script name with the Roman-script name may include determining whether at least one of the plurality of Roman character sets corresponding to the plurality of phonemes included in the Korean-script name is included in the Roman-script name.

According to various embodiments of the present disclosure, the operation of unifying the language scripts between the name of the stored contact information and the name of the received contact information may be performed by transmitting, to an external server, a request for language script unification between the name of the stored contact information and the name of the received contact information and receiving a result of the language script unification via the communication circuit.

According to various embodiments of the present disclosure, the comparing the name of the stored contact information with the name of the received contact information may be performed excluding an unimportant part of each of the name of the stored contact information and the name of the received contact information.

According to various embodiments of the present disclosure, the unimportant part may include at least one of a title, an address term, a number, or a special character.

According to various embodiments of the present disclosure, the comparing the name of the stored contact information and the name of the received contact information may be performed based on an abbreviation.

According to various embodiments of the present disclosure, an operation of determining whether to integrate the stored contact information and the received contact information may be performed by further comparing a telephone number or a mail address included in the stored contact information with a telephone number or a mail address included in the received contact information.

A method to be performed in an electronic device according to various embodiments of the present disclosure may include receiving at least one piece of contact information from the outside, unifying language scripts between a name of contact information stored in a memory and a name of the received contact information, comparing the name of the stored contact information with the name of the received contact information in a unified language script, and determining whether to integrate the stored contact information and the received contact information based on a result of the comparing.

According to various embodiments of the present disclosure, the unifying the language scripts between the name of the stored contact information and the name of the received contact information may be performed based on a Roman script which is a default script.

According to various embodiments of the present disclosure, converting a Korean-script name into a Roman-script name may include generating a plurality of Roman character sets by applying a phoneme-based Romanization system to each of a plurality of phonemes included in the Korean-script name.

According to various embodiments of the present disclosure, the comparing the name of the stored contact information with the name of the received contact information may include comparing each of the plurality of Roman character sets corresponding to the Korean-script name with the Roman-script name.

According to various embodiments of the present disclosure, the comparing each of the plurality of Roman character sets corresponding to the Korean-script name with the Roman-script name may include determining whether at least one of the plurality of Roman character sets corresponding to the plurality of phonemes included in the Korean-script name is included in the Roman-script name.

According to various embodiments of the present disclosure, the determining of whether to integrate the stored contact information and the received contact information may be performed by further comparing a telephone number or a mail address included in the stored contact information with a telephone number or a mail address included in the received contact information.

The term "circuit" used herein may represent, for example, a unit including one of hardware, software and firmware or a combination thereof. The term "circuit" may be interchangeably used with the term "unit", "logic", "logical block", "component" or "circuit". The "circuit" may be a minimum unit of an integrated component or may be a part thereof. The "circuit" may be a minimum unit for performing one or more functions or a part thereof. The "circuit" may be implemented mechanically or electronically. For example, the "circuit" may include at least one of an application-specific integrated circuit (ASIC) chip, a field-programmable gate array (FPGA), or a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 140.

According to various embodiments of the present disclosure, in a computer-readable recording medium which stores computer-readable instructions to be executed by at least one processor, the instructions may be configured to perform: receiving at least one piece of contact information from the outside; unifying language scripts between a name of contact information stored in a memory and a name of the received contact information; comparing the name of the stored contact information with the name of the received contact information in a unified language script; and determining whether to integrate the stored contact information and the received contact information based on a result of the comparing.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to an electronic device and a method according to various embodiments of the present disclosure, even if contact information stored in a memory and contact information received from the outside are written in different languages or different language scripts, the two pieces of contact information may be integrated if the two pieces of contact information have names regarded as being the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a memory configured to store a plurality of pieces of contact information;
a communication circuit configured to receive at least one piece of contact information from an external source; and
a processor configured to:
unify, into a third language script, at least one of name among a name of the stored contact information in a first language script and a name of the received contact information in a second language script, wherein the second language script is different from the first language script, and
determine whether to integrate the stored contact information and the received contact information based on comparing, in the third language script, the name of the stored contact information with the name of the received contact information,
wherein the unifying of the language scripts between the name of the stored contact information and the name of the received contact information is performed based on the third language script, and
wherein the third language script includes a same language script as the first language script or the second language script.

2. The electronic device of claim 1, wherein the first language script and the second language script are identified based on a Unicode.

3. The electronic device of claim 1,
wherein the third language script further includes a different language script than the first language script and the second language script.

4. The electronic device of claim 1, wherein, when one of the name of the stored contact information or the name of the received contact information is written in a Korean script and the other is written in a Roman script, the unifying of the language scripts comprises converting a Korean-script name into a Roman-script name.

5. The electronic device of claim 4, wherein the converting of the Korean-script name into the Roman-script name comprises generating a plurality of Roman character sets by applying a phoneme-based Romanization system to each of a plurality of phonemes included in the Korean-script name.

6. The electronic device of claim 5, wherein the phoneme-based Romanization system is differently applied based on whether a first phoneme is placed as an initial consonant or the first phoneme is placed as a final consonant.

7. The electronic device of claim 5, wherein the comparing of the name of the stored contact information with the name of the received contact information comprises comparing each of the plurality of Roman character sets, which corresponds to the Korean-script name, with the Roman-script name.

8. The electronic device of claim 7, wherein the comparing of each of the plurality of Roman character sets, which correspond to the Korean-script name, with the Roman-script name comprises determining whether at least one of the plurality of Roman character sets, which corresponds to the plurality of phonemes included in the Korean-script name, is included in the Roman-script name.

9. The electronic device of claim 1, wherein the unifying of the language scripts between the name of the stored contact information and the name of the received contact information comprises:
transmitting, to an external server using the communication circuit, a request for language script unification between the name of the stored contact information and the name of the received contact information, and
receiving, from the external server using the communication circuit, a result of the language script unification.

10. The electronic device of claim 1, wherein the comparing of the name of the stored contact information with the name of the received contact information comprises excluding an unimportant part of the name of the stored contact information and an unimportant part of the name of the received contact information.

11. The electronic device of claim 10, wherein the unimportant part of the name of the stored contact information and the unimportant part of the name of the received contact information each comprises at least one of a name suffix, a title, an address term, a number, or a special character.

12. The electronic device of claim 1, wherein the comparing of the name of the stored contact information with the name of the received contact information is based on an abbreviation.

13. The electronic device of claim 1, wherein the determining of whether to integrate the stored contact information and the received contact information comprises comparing a telephone number or a mail address included in the stored contact information with a telephone number or a mail address included in the received contact information.

14. A method to be performed by an electronic device, the method comprising:
receiving at least one piece of contact information from an external source;
unifying, into a third language script, at least one of name among a name of stored contact information in a first language script, which is stored in a memory, and a name of the received contact information in a second language script different from the first language script;
comparing, in the third language script, the name of the stored contact information with the name of the received contact information; and
determining whether to integrate the stored contact information and the received contact information based on a result of the comparing,
wherein the unifying of the language scripts between the name of the stored contact information and the name of the received contact information is performed based on the third language script, and
wherein the third language script includes a same language script as the first language script or the second language script.

15. The method of claim 14, wherein the unifying of the language scripts between the name of the stored contact information and the name of the received contact information is performed based on a Roman script which is a default script.

16. The method of claim 15, wherein, when one of the name of the stored contact information or the name of the received contact information is written in a Korean script and the other is written in a Roman script, the unifying of the language scripts comprises converting a Korean-script name into a Roman-script name.

17. The method of claim 16, wherein the converting of the Korean-script name into the Roman-script name comprises generating a plurality of Roman character sets by applying a phoneme-based Romanization system to each of a plurality of phonemes included in the Korean-script name.

18. The method of claim 17, wherein the comparing of the name of the stored contact information with the name of the received contact information comprises comparing each of the plurality of Roman character sets, which corresponds to the Korean-script name, with the Roman-script name.

19. The method of claim 14, wherein the determining of whether to integrate the stored contact information and the received contact information comprises comparing a telephone number or a mail address included in the stored contact information with a telephone number or a mail address included in the received contact information.

20. At least one non-transitory computer-readable recording medium for storing a computer program configured to be readable by at least one processor, for instructing the at least one processor to execute a computer process for performing a method comprising:

receiving contact information from an external source;
  unifying, into a third language script, at least one of name among a name of stored contact information in a first language script, which is stored in a memory, and a name of the received contact information in a second language script different from the first language script;
  comparing, in the third language script, the name of the stored contact information with the name of the received contact information; and
  determining whether to integrate the stored contact information and the received contact information based on a result of the comparing,
  wherein the unifying of the language scripts between the name of the stored contact information and the name of the received contact information is performed based on the third language script, and
    wherein the third language script includes a same language script as the first language script or the second language script.

* * * * *